US008515580B2

(12) United States Patent
Taylor et al.

(10) Patent No.: US 8,515,580 B2
(45) Date of Patent: Aug. 20, 2013

(54) DOCKING PROCESS FOR RECHARGING AN AUTONOMOUS MOBILE DEVICE

(75) Inventors: Trevor Taylor, Redmond, WA (US); Michael Wyrzykowski, Seattle, WA (US); Glen C. Larsen, Issaquah, WA (US); Mike M. Paull, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 171 days.

(21) Appl. No.: 13/162,795

(22) Filed: Jun. 17, 2011

(65) Prior Publication Data

US 2012/0323365 A1    Dec. 20, 2012

(51) Int. Cl.
*G05B 15/00* (2006.01)

(52) U.S. Cl.
USPC .................................. 700/259; 901/47; 901/1

(58) Field of Classification Search
CPC ....................... A47L 2201/02; A47L 2201/022
USPC .................................................. 700/245, 259
See application file for complete search history.

(56) References Cited

U.S. PATENT DOCUMENTS

| | | | |
|---|---|---|---|
| 6,764,373 B1 * | 7/2004 | Osawa et al. ................... | 446/175 |
| 7,227,327 B2 * | 6/2007 | Im .............................. | 318/568.12 |
| 7,636,621 B2 | 12/2009 | Lee et al. | |
| 7,729,801 B2 * | 6/2010 | Abramson ..................... | 700/245 |
| 2004/0158357 A1 * | 8/2004 | Lee et al. ....................... | 700/258 |
| 2007/0021869 A1 * | 1/2007 | Baek et al. ..................... | 700/245 |
| 2007/0050086 A1 * | 3/2007 | Lim et al. ....................... | 700/245 |
| 2007/0199108 A1 * | 8/2007 | Angle et al. ..................... | 901/17 |
| 2007/0233319 A1 * | 10/2007 | Im et al. ......................... | 700/245 |
| 2009/0261778 A1 | 10/2009 | Kook | |
| 2010/0171464 A1 | 7/2010 | Choi | |
| 2012/0286730 A1 * | 11/2012 | Bonny .......................... | 320/109 |

OTHER PUBLICATIONS

Sheithauer, Amy T., "3D Relative Position and Orientation Estimation for Rendezvous and Docking Applications Using a 3D Imager", Mar. 2010, Master's Thesis; Russ College of Engineering and Technology of Ohio University.*
Hannaford, Kat, "Real Wireless Charging Will Arrive by 2012, Fujitsu Claims", Retrieved at <<http://m.gizmodo.com/5636704/real-wireless-charging-will-arrive-by-2012-fujitsu-claims>>, Sep. 13, 2010, pp. 1-5.
Edney, Andrew, "Review of the Powermat Wireless Charging System", Retrieved at <<http://usingwindowshomeserver.com/2009/10/25/review-of-the-powermat-wireless-charging-system/>>, Oct. 25, 2009, pp. 1-5.

(Continued)

*Primary Examiner* — Khoi Tran
*Assistant Examiner* — Ryan Rink
(74) *Attorney, Agent, or Firm* — Medley, Behrens & Lewis, LLC

(57) ABSTRACT

Described herein are technologies pertaining to autonomously docking a mobile robot at a docking station for purposes of recharging batteries of the mobile robot. The mobile robot uses vision-based navigation and a known map of the environment to navigate toward the docking station. Once sufficiently proximate to the docking station, the mobile robot captures infrared images of the docking station, and granularly aligns itself with the docking station based upon the captured infrared images of the docking station. As the robot continues to drive towards the docking station, the robot monitors infrared sensors for infrared beams emitted from the docking station. If the infrared sensors receive the infrared beams, the robot continues to drive forward until the robot successfully docks with the docking station.

18 Claims, 10 Drawing Sheets

(56) References Cited

OTHER PUBLICATIONS

Kartoun, et al., "Vision-Based Autonomous Robot Self-Docking and Recharging", Retrieved at <<http://ieeexplore.ieee.org/stamp/stamp.jsp?tp=&arnumber=4259903>>, Jul. 24, 2006, pp. 1-8.

Lisa, "Palm Pre: Cool Cell Phone Has a Wireless Charging", Retrieved at <<http://hubpages.com/hub/Palm-Pre-First-Cell-Phone-with-Wireless-Charger>>, Retrieved Date: Mar. 1, 2011, pp. 1-2.

* cited by examiner

DOCKING PROCESS FOR RECHARGING AN AUTONOMOUS MOBILE DEVICE

BACKGROUND

A "robot", as the term will be used herein, is an electro-mechanical machine that includes computer hardware and software that causes the robot to perform functions independently and without assistance from a user. An exemplary robot is a droid that can be configured to fly into particular locations without being manned by a pilot. Sensors on the droid can output data that can cause such droid to adjust its flight pattern to ensure that the droid reaches an intended destination.

While the droid is generally utilized in military applications, other consumer-level robots have relatively recently been introduced to the market. For example, a vacuum cleaner has been configured with sensors that allow such vacuum cleaner to operate independently and vacuum a particular area, and thereafter automatically return to a docking station. In yet another example, robot lawnmowers have been introduced, wherein an owner of such a robot lawnmower defines a boundary, and the robot lawnmower proceeds to cut grass in an automated fashion based upon the defined boundary.

The above exemplary robots are generally powered by batteries that reside on the robot. For robots equipped with non-rechargeable batteries, a user of the robot manually replaces the batteries once electric charge of the batteries has been dissipated. Many of the aforementioned robots, however, are equipped with at least one rechargeable battery, wherein the battery of a robot can be recharged by causing the robot to be docked in a docking station. Several approaches have been designed to cause a robot to autonomously return to a docking station responsive to detecting that charge of rechargeable batteries of the robot is below a threshold. These approaches, however, generally require relatively expensive hardware to be successful.

SUMMARY

The following is a brief summary of subject matter that is described in greater detail herein. This summary is not intended to be limiting as to the scope of the claims.

Various technologies pertaining to autonomously docking a robot are described herein. The robot can utilize a combination of vision-based navigation and detection of narrow field infrared (IR) beams emitted from a docking station in connection to autonomously docking at the docking station. The robot includes a depth sensor, a video camera, an infrared sensor and computer executable instructions that cause the robot to autonomously dock at the docking station based at least in part upon data received at the video camera, the depth sensor, and the IR sensor.

The robot can include local data storage that retains a map of the environment of the robot. For instance, the robot may be configured to perform one or more tasks in a home, and may have a map of such home retained in memory of the robot. The map may be a positional grid, a series of nodes (discrete points), or the like. The map can include an approximate location of a docking station for the robot. The robot can monitor electrical charge in rechargeable batteries of the robot and, upon detecting that the electrical charge in the rechargeable battery has dropped beneath a threshold, can utilize the map to begin autonomously navigating towards the docking station. Pursuant to an example, the robot can include computer-executable instructions that facilitate autonomously navigating to the approximate location of the docking station based at least in part upon video captured by the video camera of the robot and/or depth data captured by the depth sensor on the robot.

The docking station may have reflectors (e.g., reflective tape) applied selectively thereto in a particular pattern and/or may have IR LEDs that are configured to emit IR radiation in a particular pattern. The depth sensor of the robot can include an IR beam projector and an IR camera. Subsequent to the robot becoming proximate to the approximate location of the docking station (e.g., within 2 meters), the IR beam projector can project IR light towards the docking station, and the IR camera can capture an image of the docking station, wherein, for instance, the IR image includes the particular pattern. This captured IR image may then be compared with a previously generated signature that is indicative of the three-dimensional shape of the docking station and/or the pattern of the reflectors on the docking station. By comparing the captured IR image with the signature, the robot can autonomously drive (accurately) towards the docking station. As the robot drives towards the docking station, the IR camera can continue to capture infrared images of the docking station such that the robot can accurately position itself for docking thereon.

Once the robot reaches a threshold distance from the docking station (e.g., 0.5 meters) the robot can begin monitoring IR sensors thereon for narrow field IR light beams emitted from the docking station. Pursuant to an example, the docking station may include a plurality of IR LEDs that emit narrow field beams of IR light. These beams are directed such that receipt of an IR beam at the IR sensor provides the robot with validation as to the current alignment/travel direction of the robot with respect to the docking station. In other words, the IR LEDs can be configured such that the IR sensors receive the IR beams emitted from the docking station only if the robot is aligned properly for docking on the docking station. If the robot fails to detect an IR beam (e.g., the robot is misaligned with the docking station), the robot can move away from the docking station and re-approach the docking station utilizing the techniques described above. As the robot drives onto the docking station, if the robot is in some way impeded or electrical contacts of the robot fail to mate with electrical contacts of the docking station, the robot can drive away from the docking station and reattempt to dock with the docking station using the techniques described above.

After the electrical contacts of the robot mate with the electrical contacts of the docking station, a handshake procedure can be undertaken between the robot and docking station to prevent the docking station from outputting electrical power until it is confirmed that it is the robot that on the docking station. For example, the docking station can detect that an object has mated with the electrical contacts of the docking station, and the docking station can transmit a message by way of one of the electrical contacts requesting a digital signature from the object. Responsive to receiving this request, the robot can transmit the digital signature to the docking station, which can authenticate the digital signature of the robot. Subsequent to authenticating the digital signature, the docking station can provide electrical charge to rechargeable batteries of the robot via the electrical contacts. Subsequent to the robot battery being fully charged, the robot can drive off of the docking station and continue with performing a task. If the docking station is unable to authenticate the digital signature of the robot, the docking station can fail to provide an electrical charge to the object that is in electrical contact with the docking station.

DETAILED DESCRIPTION

Figure 1:
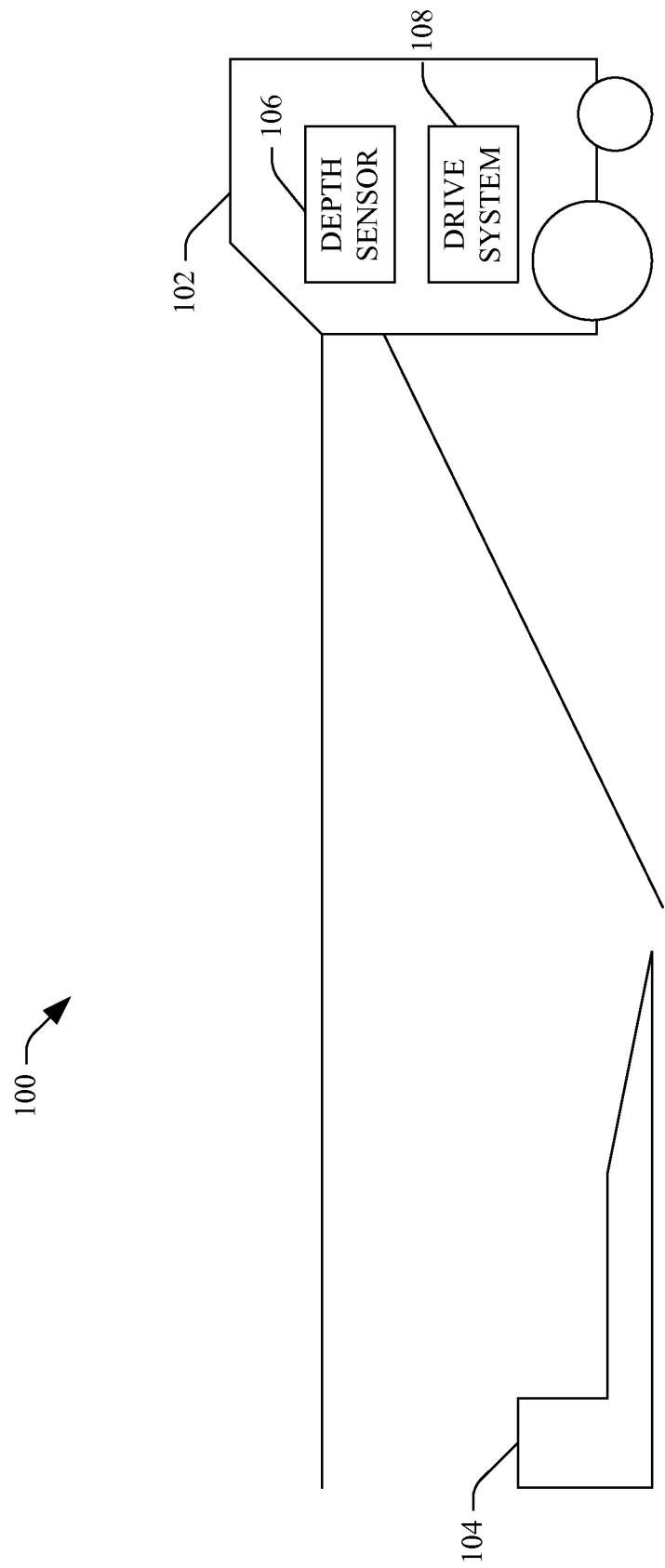
FIG. 1 is a functional block diagram that illustrates a robot autonomously docking with a docking station.

Various technologies pertaining to autonomously docking a robot at a docking station will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, the terms "component" and "system" are intended to encompass hardware that is configured to perform particular functionality, such as a field-programmable gate array.

With reference now to FIG. 1, an exemplary system 100 that facilitates autonomous docking of a robot at a docking station is illustrated. The system 100 comprises a battery-powered mobile robot 102. In an example, when electric charge of rechargeable batteries of the robot 102 falls beneath a predefined threshold or wishes to add charge to rechargeable batteries to facilitate performance of a future task, the robot 102 can autonomously approach a docking station 104 for docking thereon, wherein the docking station 104 is configured to recharge the rechargeable batteries. Pursuant to an example, when the robot 102 determines that the electric charge in the rechargeable batteries has fallen below the threshold, the robot 102 can access a map of its environment, which includes an approximate location of the docking station 104 relative to a current position of the robot 102. The robot 102 may then utilize the map together with vision-based navigation to travel to the approximate location of the docking station 104. Causing the robot 102 to autonomously dock with the docking station 104, however, is a relatively precise task, as the electrical contacts (which may be relatively small in size) on the robot 102 must mate with electrical contacts on the docking station 104. Additionally, it may be desirable to cause the robot 102 to dock autonomously at the docking station 104 at night, when lights of a home are turned off. Because the robot 102 is inside, conventional location-based analysis such as GPS sensors are not sufficiently accurate to cause the robot 102 to dock with the docking station 104. Additionally, as ambient light surrounding the docking station 104 can change, autonomous navigation that relies on an RGB camera will not operate effectively.

Therefore, the robot 102 may include a depth sensor 106 that can identify three-dimensional shape of objects and/or relative distance between an object and the robot 102. In an example, the depth sensor 106 can include an infrared (IR) beam projector that projects IR light. Additionally, the depth sensor 106 may include an IR camera that can capture IR images. Once the robot 102 is sufficiently proximate to the docking station 104, a docking protocol can be initiated, which causes the depth sensor 106 to acquire an image of the docking station 104, wherein the image can be indicative of three-dimensional shape of the docking station 104. Additionally or alternatively, the docking station 104 may have a plurality of reflectors (e.g., reflective tape, mirrors, . . . ) applied thereto in a particular pattern that is known to the robot 102. Accordingly, when the IR beam projector projects IR light, the reflectors reflect such light and the light is captured by the IR camera. Thus, the IR image will capture the known pattern of the reflectors on the docking station 104. In another example, rather than the docking station 104 having reflectors applied thereto, the docking station 104 may be configured with IR light emitting diodes (LEDs) that output IR light in a particular pattern (spatial, temporal, or a combination thereof), and the IR camera of the depth sensor 106 can capture images of the docking station 104 that include light emitted from the LEDs in the known pattern.

The robot 102 can be configured with computer-executable instructions that cause a comparison to be made between the image captured by the depth sensor 106 and a previously generated image. For example, upon an initial docking of the robot 102, a human can manually direct the robot towards the docking station 104 and can cause the robot 102 to capture IR images of the docking station 104 as the robot 102 is directed towards the docking station 104. At this time, the docking station 104 can have the reflectors applied thereto in the particular pattern, such that all IR images captured by the robot 102 will include such pattern. These images captured during an initial docking of the robot 102 at the docking station 104 can be retained by the robot 102 for future comparison with images captured by the depth sensor 106 during autonomous docking.

The robot 102 may further comprise a drive system 108 (which may include motor(s)) that can be directed to drive the robot 102 towards the docking station 104 based at least in part upon the comparison between the image captured by the depth sensor 106 and the previously generated image. That is, the drive system 108 can control direction of travel of the robot 102 and orientation of the robot 102 with respect to the docking station 104 based at least in part upon the comparison between the image captured by the depth sensor 106 and the previously captured image.

While the robot 102 has been described above as utilizing an IR camera to capture an IR image of the docking station 104, it is to be understood that the depth sensor 106 may include a camera that is configured to capture some other form of non-visible radiation in connection with causing the drive system 108 to drive the robot 102 towards the docking station 104. For instance, the depth sensor 106 may include an ultraviolet light beam projector as well as an ultraviolet camera that is configured to capture ultraviolet images. In another example, the depth sensor 106 may utilize ultrasonic technologies in connection with generating an image of the docking station 104 when autonomously docking the robot 102 with the docking station 104.

In some instances, the robot 102 may become improperly aligned with the docking station 104 as the robot 102 approaches the docking station 104. This misalignment can be detected by comparing the image captured by the depth sensor 106 with the previously captured image. If misalignment occurs, the robot 102 can be configured with computer executable instructions that cause the drive system 108 to reposition the robot 102 relative to the docking station 104. For instance, the drive system 108 can cause the robot 102 to move further away from the docking station 104 to allow for realignment of the robot 102 relative to the docking station 104. Thereafter, the depth sensor 106 can capture new images of the docking station 104 and the drive system 108 can drive the robot 102 towards the docking station 104 based at least in part upon comparison between the image captured by the depth sensor 106 and a previously captured image.

Figure 2:
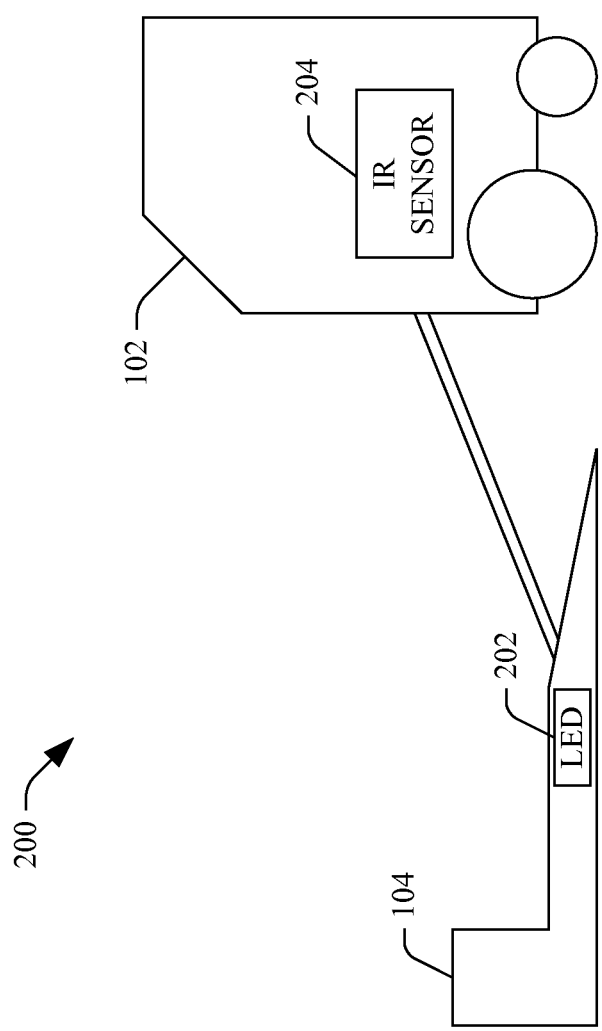
FIG. 2 is a functional block diagram that illustrates utilizing an LED to emit infrared (IR) beams to facilitate autonomous docking of a robot at a docking station.

With reference now to FIG. 2, another exemplary system 100 that facilitates autonomously docking the robot 102 with the docking station 104 is illustrated. The technique described with respect to FIG. 1 can allow the robot 102 to properly orient itself with respect to the docking station 104 prior to the robot 102 becoming immediately proximate to the docking station 104 (e.g., within 0.5 meters of the docking station 104). As the robot 102 continues to become closer to the docking station 104, however, the depth sensor 106 will no longer be able to capture images of the pattern on the docking station 104, as the reflectors (or LEDs) will fall out of the viewing range of the IR camera. Accordingly, to continue the process of autonomously docking the robot 102 with the docking station 104, another mechanism can be employed. Pursuant to an example, the docking station 104 can include at least one IR LED 202 that emits a narrow field IR beam. The LED 202 can continuously emit the IR beam or can emit the IR beam when the robot 102 is detected as being relatively proximate to the docking station 104.

The robot 102 can comprise an IR sensor 204 that is positioned on the body of the robot 102. The LED 202 can be configured to emit the IR beam such that the IR sensor 204 on the robot 102 will receive such IR beam so long as the robot 102 is approaching the docking station 104 at an orientation that allows for proper docking of the robot 102. In an example, the IR sensor 204 can be positioned near the center of the body of the robot 102 and the LED 202 can be positioned near the center of the docking station 104. The LED 202 can emit the IR beam in a direction such that if the IR beam is received at the IR sensor 204, the robot 102 can have knowledge that it is aligned properly with the docking station 104 for autonomous docking.

In another example, the docking station 104 can comprise a plurality of LEDs that are spatially arranged with respect to one another and the robot 102 can comprise a plurality of IR sensors 204 that are arranged to receive the IR beams emitted from the LEDs of the docking station 104 so long as the robot 102 is properly aligned with the docking station 104 for autonomous docking. Accordingly, so long as the IR sensors 204 receive the IR beams emitted from the LEDs of the docking station 104, the robot 102 can continue to drive forward onto the docking station 104. If, however, the robot 102 senses that one or more of the IR sensors is not receiving an IR beam emitted from the docking station 104, the robot 102 can ascertain that the robot 102 is misaligned with respect to the docking station 104 and can drive away from the docking station 104 to realign the robot 102. Alternatively, the robot 102 can swivel to ascertain if a simple realignment of the robot 102 can cause the IR sensor 204 to receive the IR beams emitted from the LED 202.

While the docking station 104 has been described as having at least one LED that emits IR light, it is to be understood that the docking station 104 may comprise LEDs that emit other forms of light, either visible or non-visible. Accordingly, the robot 102 may include a sensor that is configured to detect light of any suitable wavelength to aid the robot 102 in docking with the docking station 104 autonomously. Moreover, the docking station 104 can include a plurality of LEDs, at least some of which emit polarized light. The robot 102 can include a sensor that senses light beams and polarization of light beams, and patters of polarized versus non-polarized light beams can be utilized to aid the robot 102 in connection with autonomous docking. Still further, light emitters can be located on the robot, and the sensors can reside on the docking station 104, and the docking station 104 can communicate alignment instructions to the robot 102 based at least in part upon light emitted from the robot 102 that is detected by the docking station 104.

Figure 3:
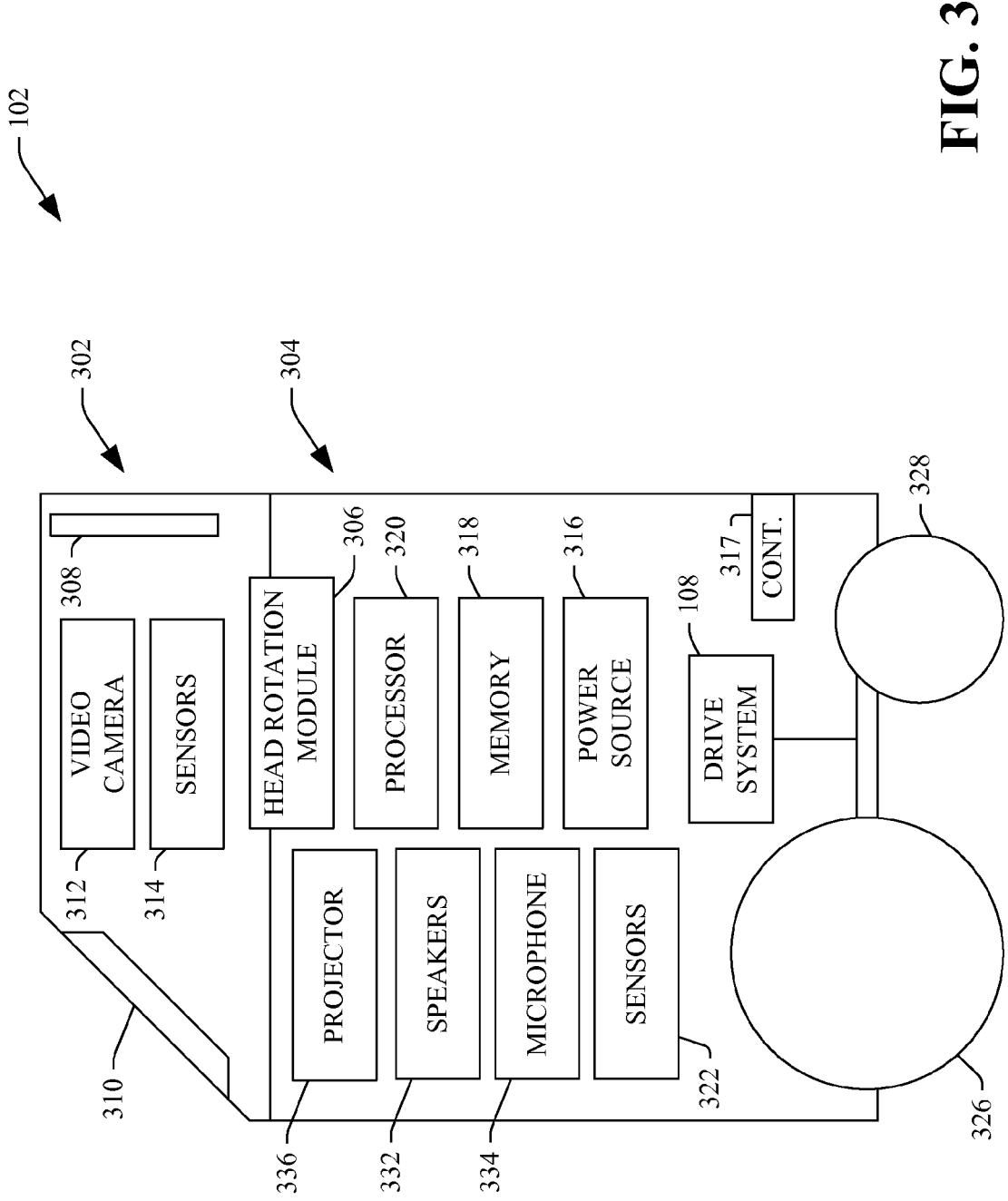
FIG. 3 illustrates exemplary modules of a robot.

Turning now to FIG. 3, an exemplary depiction of contents of the robot 102 is illustrated. The robot 102 comprises a head portion 302 and a body portion 304, wherein the head portion 302 is movable with respect to the body portion 304. The robot 102 can comprise a head rotation module 306 that operates to couple the head portion 302 with the body portion 304, wherein the head rotation module 306 can include one or more motors that can cause the head portion 302 to rotate with respect to the body portion 304. Pursuant to an example, the head rotation module 306 can be utilized to rotate the head portion 302 with respect to the body portion 304 up to 45° in any direction. In another example, the head rotation module 306 can allow the head portion 302 to rotate 90° in relation to the body portion 304. In still yet another example, the head rotation module 306 can facilitate rotation of the head portion 302 180° with respect to the body portion 304. In still yet another example, the head rotation module 306 can facilitate rotation of the head portion 302 190° in either direction with respect to the body portion 304. The head rotation module 306 can facilitate rotation of the head portion 302 with respect to the body portion 304 in either angular direction.

The head portion 302 may comprise an antenna 308 that is configured to receive and transmit wireless signals. For instance, the antenna 308 can be configured to receive and transmit WI-FI signals, Bluetooth signals, infrared signals, sonar signals, radio frequency signals or other suitable signals. In yet another example, the antenna 308 can be configured to receive and transmit data to and from a cellular tower, the Internet, of the cloud (e.g., cloud computing). The robot 102 can send and receive communications with a remotely located computing device (e.g., another robot or control device, handheld or otherwise) through utilization of the antenna 308.

The head portion 302 of the robot 102 can also comprise a display 310 that can be configured to display images or video to a user. In an example, the display 310 may be a touch sensitive display such that the user of the robot 102 can provide the robot 102 with information by way of selective interaction with the touch sensitive display. Additionally, while not shown, the robot 102 may also comprise a keypad such that a user of the robot 102 can interact with or provide information to the robot 102 through utilization of the keypad.

The head portion 302 of the robot 102 may also comprise a video camera 312 that is configured to capture images of the surroundings of the robot 102. In an example, the video camera 312 can be a high definition video camera that facilitates capturing still images or video that is in, for instance, 720 p format, 720 i format, 1080 p format, 1080 i format, or other suitable high definition video format. Additionally or alternatively, the video camera 312 can be configured to capture relatively low resolution data in a format that is suitable for transmission through a remote computing device by way of the antenna 308.

As the video camera 312 is mounted in the head portion 302 of the robot 102, through utilization of the head rotation module 306 the video camera 312 can be configured to capture live video data of a relatively large portion of an environment of the robot 102. For instance, the video camera 312 can be configured to perform a 360° scan of an environment of the robot as the head portion 302 rotates about the body portion 304 of the robot 102. As has been mentioned above, images captured by the video camera 312 can be utilized by the robot 102 to perform vision-based autonomous navigation.

The robot 102 may further comprise one or more sensors 314, wherein such sensors 314 may be or include any suitable sensor type that can aid the robot 102 in performing one or more functions, such as autonomous navigation, autonomous docking, or the like. For example, the sensors 314 may comprise the depth sensor 106, which as mentioned above may include an IR camera and an IR beam projector. The sensors 314 may also comprise a cliff sensor that is configured to detect a drop-off in elevation proximate to the robot 102, a GPS sensor, an accelerometer, a gyroscope, or other suitable type of sensor.

The body portion 306 of the robot 102 may include a power source 316 that is operable to provide power to other modules in the robot 102. The power source 316 can be, for example, a battery, a supercapacitor, a fuel cell, a chemical fuel cell, etc. The power source 316 may be, for instance, a rechargeable battery that can be charged by docking the robot 102 with the docking station 104. Accordingly, the robot 102 may comprise electrical contacts 317 that can mate with the electrical contacts of the docking station 104 to allow electrical charge to be delivered from the docking station 104 to the power source 316.

The body portion 304 of the robot 102 can also comprise a memory 318 and a corresponding processor 320. As will be described in greater detail below, the memory 318 can comprise a plurality of components that are executable by the processor 320, wherein execution of such components facilitates controlling one or more modules of the robot 102. The processor 320 can be in communication with other modules in the robot 102 by way of any suitable interface such as, for instance, a motherboard. It is to be understood that the processor 320 is the "brains" of the robot 102 and is utilized to process data received from a remote computer as well as other modules in the robot 102 to cause the robot 102 to perform in a manner desired by a user of such robot 102.

The body portion 304 of the robot 102 can further comprise one or more sensors 322, wherein such sensors 322 can include any suitable sensor that can output data that can be utilized in connection with autonomous or semi-autonomous navigation, autonomous docking, or the like. For example, the sensors 322 may be or include sonar sensors, location sensors, the IR sensors 204, a camera, a cliff sensor, and/or the like. Data that is captured by the sensors 322 and the sensors 314 can be provided to the processor 320, which can process such data and autonomously dock the robot 102 at the docking station based at least in part upon data output by the sensors 314 and 322.

The body portion 304 of the robot 102 may further comprise the drive system 108 that is operable to drive wheels 326 and 328 of the robot 102. For example, the wheel 326 can be a driving wheel, while the wheel 328 can be a steering wheel that can act to pivot to change the orientation of the robot 102. Additionally, each of the wheels 326 and 328 can have a steering mechanism corresponding thereto such that the wheels 326 and 328 can contribute to the change in orientation of the robot 102. Furthermore, while the drive system 108 is shown as driving both of the wheels 326 and 328, it is to be understood that the drive system 108 may drive only one of the wheels 326 or 328 while another drive motor can drive the other of the wheels 326 or 328. Upon receipt of data from the sensors 314 and 322 and/or receipt of commands from a user (spoken commands, a gesture, etc.), the processor 320 can transmit signals to the head rotation module 306 and/or the drive motor 324 to control orientation of the head portion 302 with respect to the body portion 304 of the robot 102 and/or orientation and position of the robot 102.

The body portion 304 of the robot 102 can further comprise speakers 332 and a microphone 334. Data captured by way of the microphone 334 can be utilized in connection with responding to voice commands of a user. The speakers 332 can be employed to output audio data to one or more users that are proximate to the robot 102. The body portion 304 of the robot 102 may also comprise a projector 336 that can project images or video onto a projecting surface such as a wall of a home.

While the robot 102 has been shown in a particular configuration and with particular modules included therein, it is to be understood that the robot 102 can be configured in a variety of different manners and these configurations are contemplated by the inventors and are intended to fall within the scope of the hereto appended claims. For instance, the head rotation module 306 can be configured with a tilt motor so that the head portion 302 of the robot 102 can rotate with respect to the body portion 304 as well as tilt in a vertical direction. Alternatively, the robot 102 may not include two separate portions but may comprise a single unified body, wherein the robot body can be rotated to allow capture of video data by way of the video camera 312. In still yet another exemplary embodiment, the robot 102 can have a unified body structure but the video camera 312 can have a motor, such as a servo motor, associated therewith that allows the video camera 312 to alter position to obtain different views of an environment. Still further, modules shown to be in the body portion 304 can be placed in the head portion 302 of the robot 102 and vice versa. It is also to be understood that the robot 102 has been provided solely for the purposes of explanation and is not intended to be limiting as to the scope of the hereto appended claims.

Figure 4:
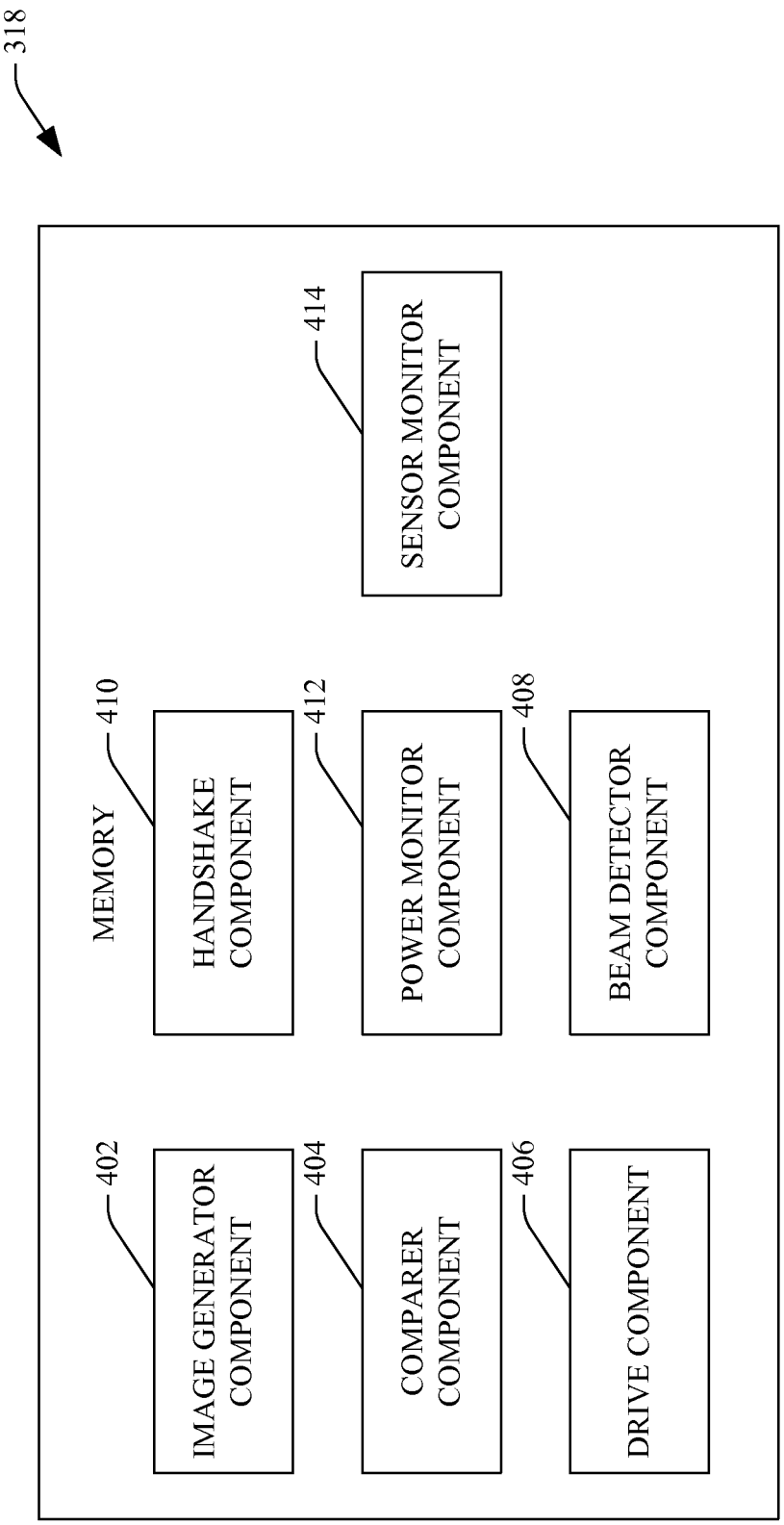
FIG. 4 is a functional block diagram of portions of memory that control actions of a robot.

With reference now to FIG. 4, an exemplary depiction of contents of the memory 318 of the robot 102 is illustrated. The memory 318 comprises an image generator component 402 that, when executed by the processor 320, can cause the depth sensor 106 to generate an image of the docking station 104, wherein the image is indicative of three-dimensional shape of the docking station 104. This image may be an IR image captured by an IR camera, may be an ultraviolet image captured by an ultraviolet camera, may be a three-dimensional image constructed from data output by a range finder, or other suitable image. Pursuant to an example, the image generator component 402 can cause the depth sensor 106 to generate the image subsequent to the robot 102 becoming relatively proximate to an estimated location of the docking station 104 (e.g., within 2 meters of the docking station 104).

The memory 318 can further comprise a comparer component 404 that can compare the image captured by the depth sensor 106 with a previously captured image of the docking station 104 and can output a signal that is indicative of an amount of similarity between the image captured by the depth sensor 106 and the previously captured image. As described above, the docking station 104 can have a plurality of reflectors applied thereto to create a distinctive pattern. Accordingly, the image captured by the depth sensor 106 can be compared with another image that was previously captured by the depth sensor 106 when the robot 102 successfully docked at the docking station 104 (e.g., during an occurrence when the robot 102 was manually docked at the docking station 104), and based upon such comparison the robot 102 can be aligned with the docking station.

A drive component 406 is in communication with the comparer component 404 and can receive the signal output by the comparer component 404 that is indicative of the amount of similarity between the image of the docking station captured by the depth sensor 106 and the previously captured image. The drive component 406 can control the drive system 108 to cause the robot to autonomously dock in the docking station 104 based at least in part upon such signal. In other words, if the comparer component 404 ascertains that the image captured by the depth sensor 106 is sufficiently similar to the previously captured image, the drive component 406 can cause the drive system 108 to continue driving the robot 102 along a certain path. As the robot 102 continues to move towards the docking station 104, the image generator component 402 can continue to cause the depth sensor 106 to capture images of the docking station 104, and these images of the docking station 104 can be compared with previously captured images of the docking station 104. Therefore, the comparer component 404 can output signals indicating how close the robot 102 is to repeating a previous path undertaken when docking with the docking station 104 was successful.

Images captured by the depth sensor 106 can be utilized in connection with autonomously driving the robot 102 to a position that is relatively proximate to the docking station 104 (e.g., one-half of one meter from the docking station 104). As the robot 102 continues to approach the docking station 104, however, the depth sensor 106 may be unable to capture images of the docking station 104 that can be used in connection with autonomously docking the robot 102. Accordingly, as described above, the docking station 104 can include at least one LED 202 that emits a beam of light (IR light). The IR sensor 204 on the robot 102 will receive the beam so long as the robot 102 is appropriately aligned with the docking station 104 when approaching the docking station 104 for docking therewith. The memory 318 can further comprise a beam detector component 408 that monitors the IR sensor 204 and outputs a signal that indicates that the IR sensor 204 is receiving the beam emitted from the LED 202 of the docking station 104. The drive component 406 is in communication with the beam detector component 408 and can cause the drive system 108 to drive the robot 102 towards the docking station 104 based at least in part upon the signal output by the beam detector component 408. Therefore, if the robot 102 is properly aligned with the docking station 104, as the robot 102 approaches the docking station 104, the beam detector component 408 can output a signal that indicates that the robot 102 is properly aligned with the docking station 104. The drive component 406 can receive the signal and can cause the drive system 108 to continue driving in the direction of the docking station 104. If, however, the beam emitted from the LED 202 of the docking station 104 is not received by the IR sensor 204, the beam detector component 408 can output a signal that indicates to the drive component 406 that the robot 102 is somehow misaligned with the docking station 104. Responsive to receiving such signal, the drive component 406 can cause the robot 102 to pivot in an attempt to properly realign with the docking station 104. If pivoting does not appropriately align the robot 102 with the docking station 104, then the drive component 406 can cause the drive system 108 to drive the robot 102 further away from the docking station 104. Thereafter, for example, the image generator component 402 can cause the depth sensor 106 to generate or capture another image of the docking station 104.

Using these techniques, the drive component 406 can autonomously cause the drive system 108 to drive the robot 102 onto the docking station 104 such that the electrical contacts 317 of the robot 102 mate with electrical contacts of the docking station 104. Prior to the docking station 104 providing electrical charge to the robot 102 (to ensure that electrical charge is not accidentally provided to a person, for example), a handshake protocol can be undertaken between the docking station 104 and the robot 102. For instance, responsive to the electrical contacts of the robot 102 mating with the electrical contacts of the docking station 104, the docking station 104 can transmit a signal to the robot 102 by way of at least one of the electrical contacts. For instance, the signal may be a request for a digital signature from the robot 102 that informs the docking station 104 that it is the robot 102 that is docked with the docking station 104. A handshake component 410 can receive this request and can cause the digital signature to be transmitted to the docking station 104. The docking station 104 can authenticate the digital signature, and subsequent to authenticating the digital signature can provide electrical charge to the robot 102. This electrical charge is utilized to recharge the batteries of the robot 102.

The memory 318 can further comprise a power monitor component 412 that monitors electrical charge of the battery of the robot 102. The power monitor component 412 can be in communication with the drive component 406 and can output a signal to the drive component 406 responsive to the rechargeable batteries of the robot 102 being fully recharged. The drive component 406 may then cause the drive system 108 to drive the robot 102 off of the docking station 104 to perform a particular task.

Generally, the components discussed above, when operating in conjunction, will cause the robot 102 to successfully autonomously dock with the docking station 104. In some instances, however, the robot 102 may become misaligned, and the robot 102 may be unable to dock with the docking station 104. For instance, wheels of the robot may be unable to turn due to misalignment of the robot 102 on the docking station 104, an impediment may block the robot 102 from docking with the docking station 104, etc. Sensors on the robot 102 can monitor movement of the robot and can ascertain that movement of the robot 102 is impeded in some fashion. A sensor monitor component 414 can monitor signals output by such sensors and if an impediment exists that prevents the robot 102 from successfully docking with the docking station 104, the sensor monitor component 414 can output a signal to the drive component 406. The drive component 406 may then cause the robot 102 to back away from the docking station 104 and re-attempt to dock with the docking station 104.

In addition to monitoring electrical charge in the rechargeable batteries of the robot 102 as such batteries are being recharged, the power monitor component 412 can monitor electrical charge of the batteries of the robot 102 when the robot 102 is not on the docking station 104. For example, the power monitor component 412 can monitor electrical charge in the batteries of the robot 102 and can output a signal to the drive component 406 when the electrical charge of such batteries falls beneath a predefined threshold. Responsive to receiving such signal, the drive component 406 can cause the drive system 108 to drive the robot 102 towards the docking station 104 (e.g., utilizing the map described above and vision-based navigation).

Figure 5:
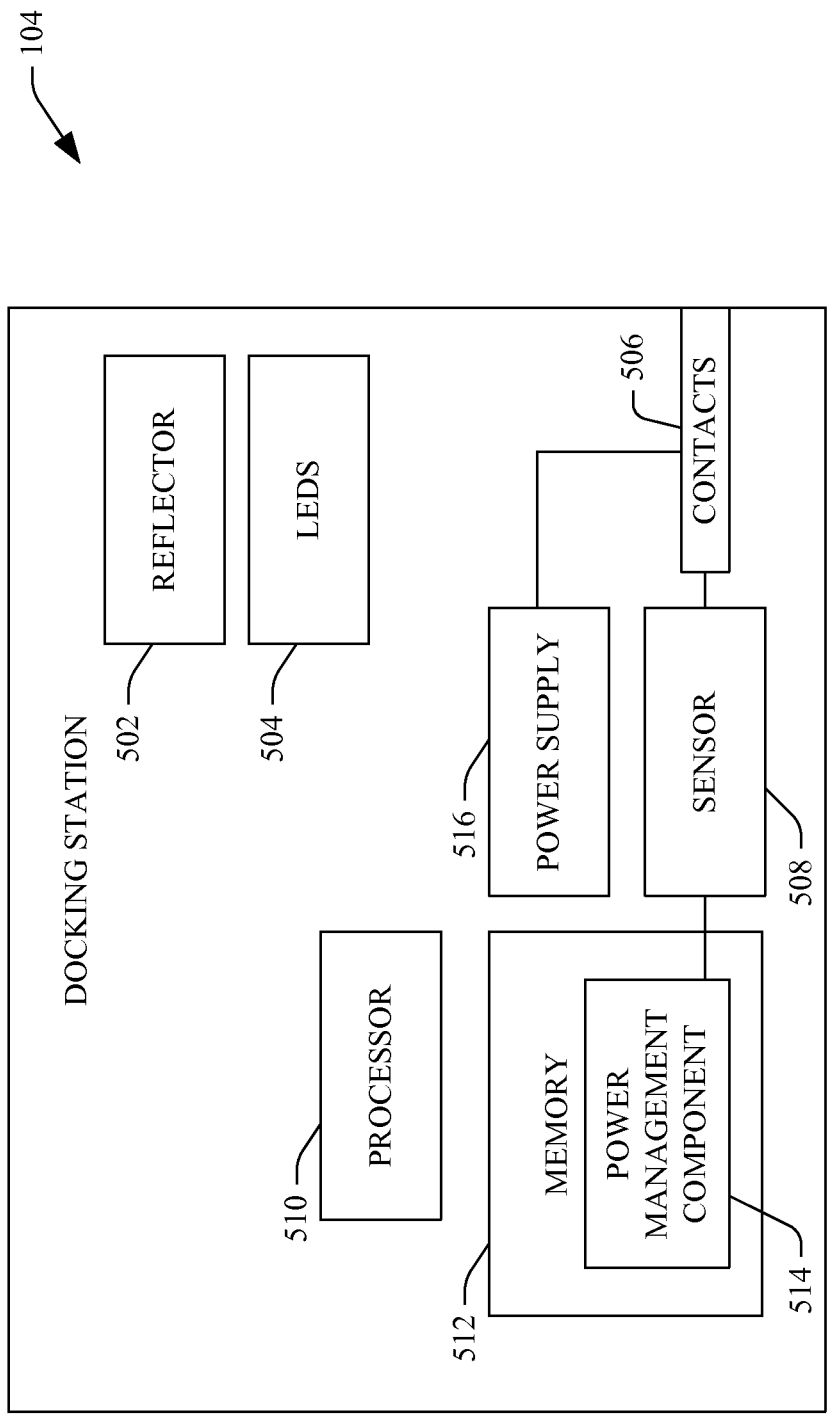
FIG. 5 is a functional block diagram of an exemplary docking station.

Now referring to FIG. 5, a functional block diagram 500 that illustrates contents of the docking station 104 is illustrated. The docking station 104 has at least one reflector 502 applied thereto, wherein the reflector 502 can reflect, for example, IR light emitted from an infrared beam projector of the robot 102. Additionally or alternatively, the docking station 104 may include one or more LEDs 504. For example, rather than having the reflector 502, the docking station 104 may include LEDs 504 that are spatially arranged in a distinctive manner to allow the docking station 104 to be identified in an image of such docking station 104. For instance, the LEDs 504 can emit non-visible light such as ultraviolet light or IR light.

The docking station 104 can further comprise electrical contacts 506 that are configured to mate with the electrical contacts 317 of the robot 102 when the robot 102 has successfully docked with the docking station 104. A sensor 508 monitors electrical contacts 506 and detects when an object, such as a robot 102, has come into contact with the electrical contacts 506 of the docking station 104.

The docking station 104 further comprises a processor 510 and a corresponding memory 512, wherein the memory 512 includes at least one component that is executable by the processor 510. Specifically, the memory 512 can include a power management component 514 that is in communication with the sensor 508. For instance, the sensor 508 can output a signal that indicates that an object has come into contact with the electrical contacts 506 and the power management component 514 can receive such signal. Responsive to receiving the signal, the power management component 514 can cause a message to be transmitted to the object by way of at least one of the electrical contacts 506, wherein such message may be a request for a digital signature that identifies the object. If the object in contact with the electrical contacts 506 is the robot 102, the robot 102 can transmit a digital signature that identifies the robot 102 and the power management component 514 can authenticate the signature. Responsive to authenticating the signature, the power management component 514 can output a signal to a power supply 516 that causes the power supply 516 to provide electrical power to the robot 102 by way of the electrical contacts 506. If the object in contact with the electrical contacts 506 cannot be authenticated (e.g., the object fails to respond to the request for the digital signature) the power management component 514 can either fail to send a signal to the power supply 516 or send a signal to the power supply 516 that prevents the power supply 516 from providing power to the object by way of the electrical contacts 506.

With reference now to FIGS. 6-9, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagated signal.

Figure 6:
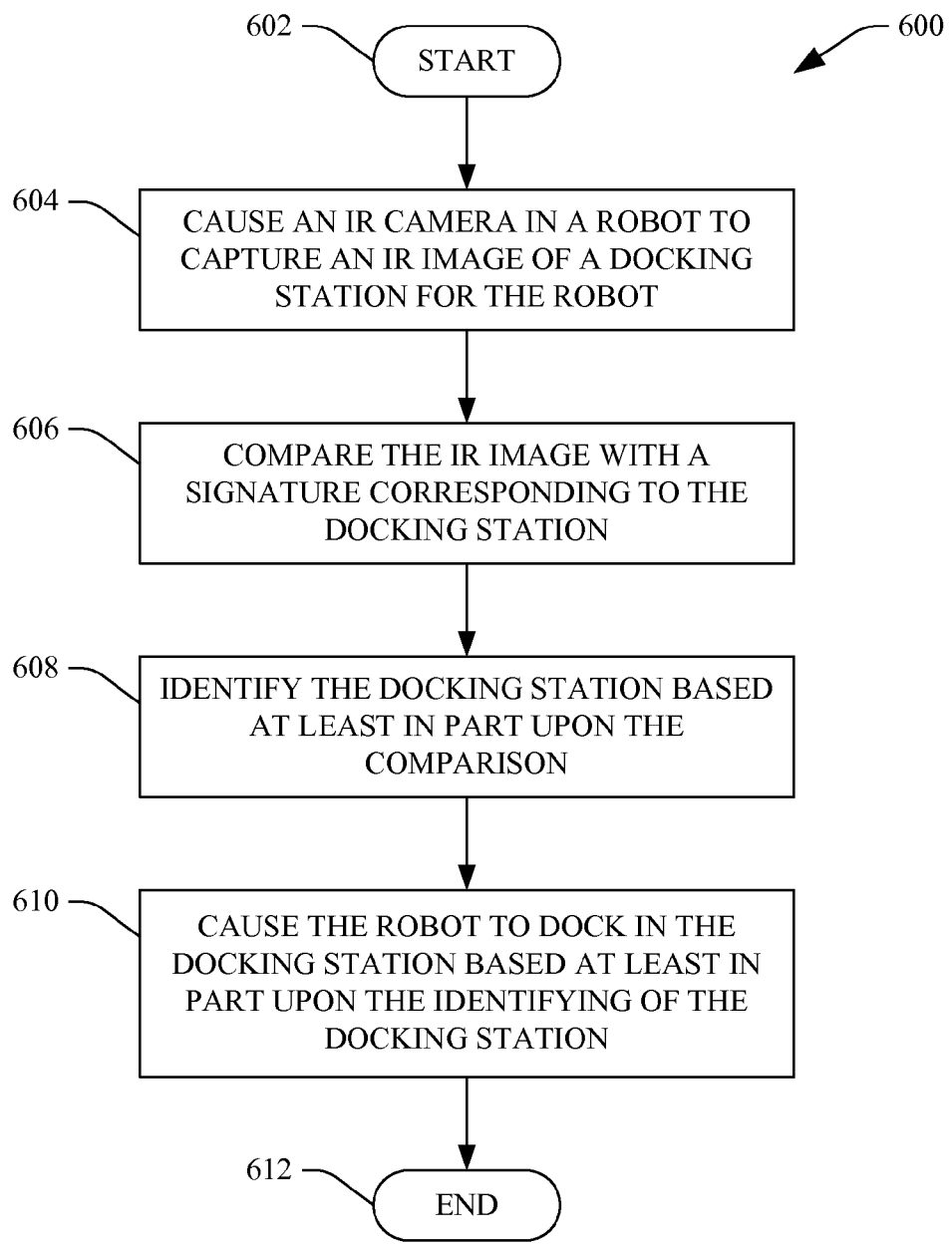
FIG. 6 is a flow diagram that illustrates an exemplary methodology for causing a robot to dock in a docking station autonomously.

With reference now to FIG. 6, an exemplary methodology 600 that facilitates causing a robot to autonomously dock with a docking station is illustrated. The methodology 600 starts at 602, and at 604 an IR camera on a robot is caused to capture an IR image of a docking station for the robot. For example, the docking station 104 may be manufactured with a distinctive shape that allows the docking station 104 to be readily distinguished from other objects in IR images. In another example, one or more reflectors can be applied to the docking station in a pattern that allows the docking station to be readily distinguished from other objects in an IR image. In yet another example, IR LEDs can be used to create a unique IR pattern on the docking station that the robot can distinguish.

At 606, the IR image is compared with a signature corresponding to the docking station. For example, the signature may be a previously captured image of the docking station during successful docking of the robot with the docking station or may be a theoretical signature that describes shape of the docking station and/or a pattern of reflectors that have been applied to the docking station.

At 608, the docking station is identified based at least in part upon the comparing of the IR image with the signature. Additionally, orientation of the robot relative to the docking station can be ascertained based at least in part upon the comparing of the IR image with the signature.

At 610, the robot is caused to dock in the docking station based at least in part upon the identifying of the docking station. The methodology 600 completes at 612.

Figure 7:
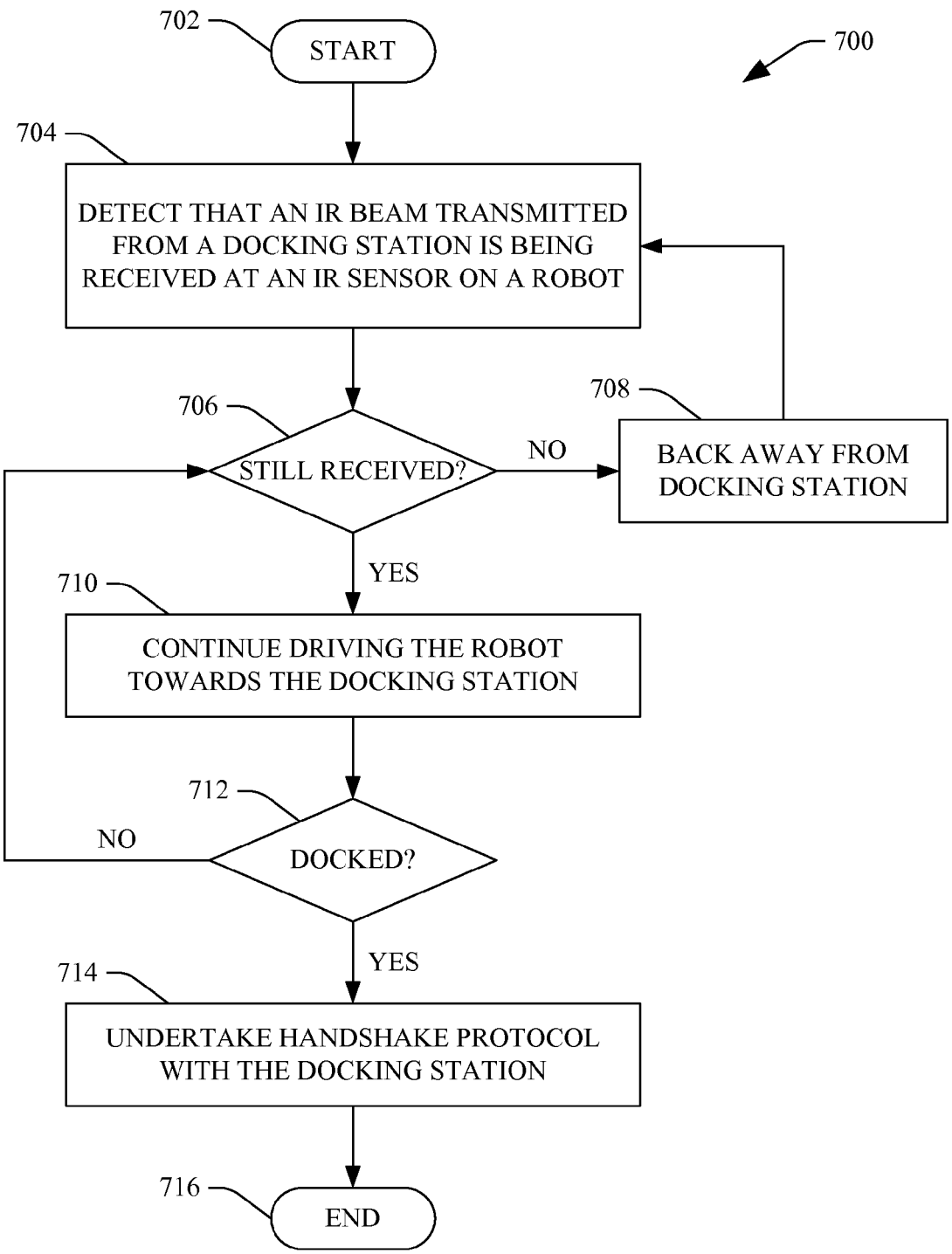
FIG. 7 is a flow diagram that illustrates an exemplary methodology for autonomously docking a robot in a docking station.

Now referring to FIG. 7, an exemplary methodology 700 that facilitates autonomously docking a robot with a docking station is illustrated. The methodology 700 starts at 702, and at 704, a detection is made that an IR beam transmitted from a docking station is being received at an IR sensor on a robot.

At 706, a determination is made regarding whether the IR sensor is continuously receiving the IR beam. If the IR beam is not being received at the IR sensor, then at 708 the robot is caused to be backed away from the docking station and the methodology returns to 704.

If at 706 it is determined that the IR beam continues to be received at the IR sensor, then at 710 the robot is caused to continue driving towards the docking station. In other words, receipt of the IR beam at the IR sensor indicates to the robot that the robot is properly approaching the docking station.

At 712, a determination is made regarding whether or not the robot has docked with the docking station. If the robot has not yet docked with the docking station, the methodology 700 returns to 706, where a check is made that the IR beam is still being received at the IR sensor. If at 712 it is determined that the robot has docked with the docking station, then at 714, a handshake protocol is undertaken with the docking station. For instance, during the handshake protocol, the robot can transmit a digital signature that informs the docking station that it is the robot that has docked with the docking station and not some other object that has come into contact with electrical contacts of the docking station. The methodology 700 completes at 716.

Figure 8:
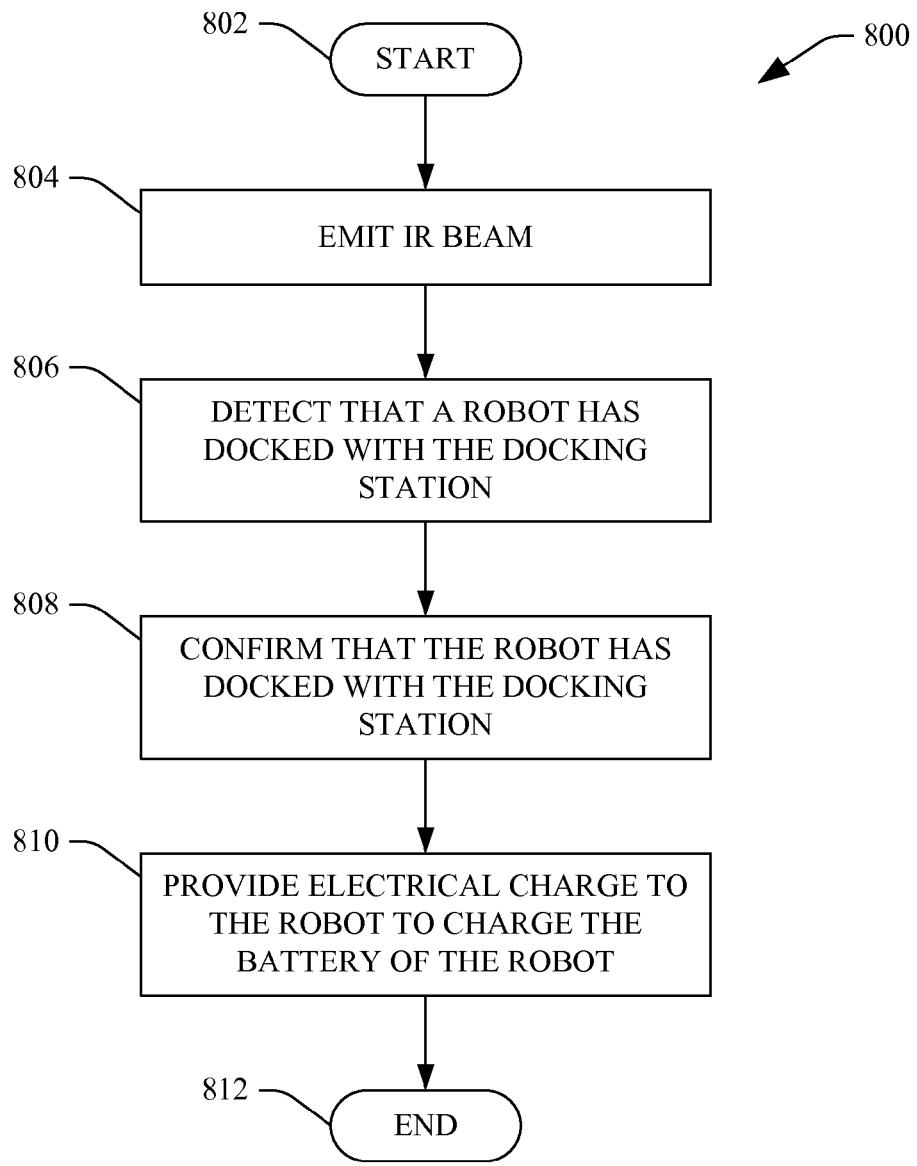
FIG. 8 is a flow diagram that illustrates an exemplary methodology for providing an electrical charge to a robot to charge such robot.

With reference now to FIG. 8, an exemplary methodology 800 that can be undertaken at a docking station in connection with a robot autonomously docking with such docking station is illustrated. The methodology 800 starts at 802, and at 804 an IR beam is emitted from the docking station. For example, a plurality of IR beams can be emitted from the docking station, wherein at least some of such IR beams may be polarized. The pattern of polarized versus non-polarized IR beams can inform the robot that the robot is appropriately approaching the docking station.

At 806, a detection is made that the robot has docked with the docking station. That is, a detection is made that electrical contacts of the robot have come into contact with electrical contacts of the docking station for purposes of recharging the robot.

At 808, it is confirmed that the robot has docked with the docking station. For instance, the handshake procedure described above can be undertaken to authenticate that the robot is docked with the docking station.

At 810, subsequent to confirming that the robot is docked with the docking station, an electrical charge is provided to the robot to charge the battery of the robot. The methodology 800 completes at 812.

Figure 9:
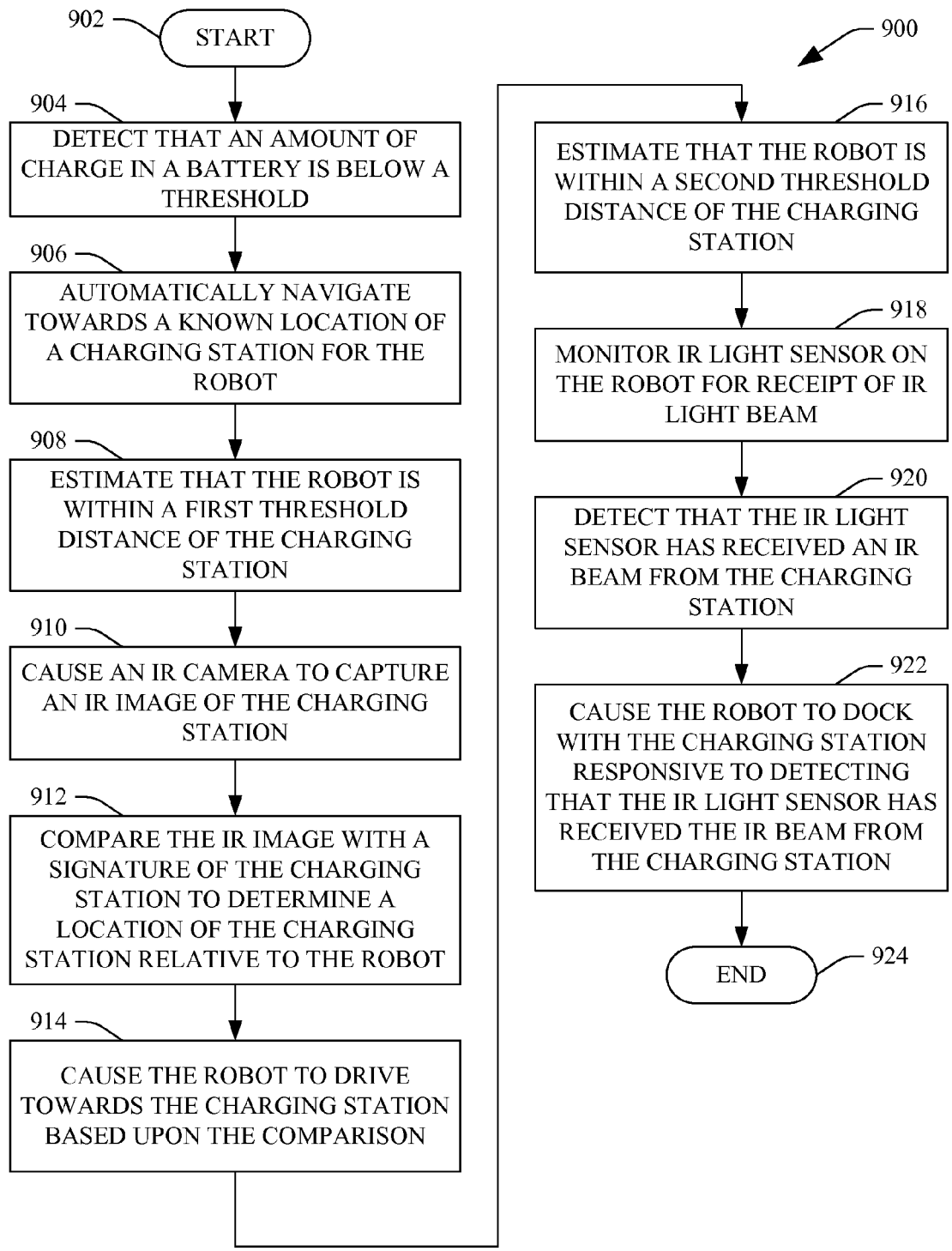
FIG. 9 is a flow diagram that illustrates an exemplary methodology for autonomously docking a robot at a docking station.

With reference now to FIG. 9, an exemplary methodology 900 that can be undertaken by a robot in connection with autonomously docking at a docking station is illustrated. The methodology 900 starts at 902, and at 904 a detection is made that an amount of charge of a battery of the robot is below a threshold amount of charge.

At 906, subsequent to detecting that the amount of charge in the battery is below the threshold, the robot automatically navigates towards a known location of a docking station for the robot. As described above, the robot can access a map of its environment and can use vision-based navigation to begin navigating towards a known location of the docking station.

At 908, an estimate is made that the robot is within a first threshold distance of a docking station. For instance, it can be estimated at the robot is within two meters of the docking station, within three meters of the docking station, or some other suitable threshold distance.

At 910, responsive to estimating that the robot is within the first threshold distance of the docking station, an IR camera can be caused to capture an IR image of the docking station.

At 912, the IR image is compared with a signature of a docking station to determine a more precise location of the docking station relative to the robot.

At 914, the robot is caused to be driven towards the docking station based upon the comparison between the IR image and the signature.

At 916, an estimation is made that the robot is within a second threshold distance of the docking station. For example, an estimate can be made that the robot is within one-half a meter from the docking station, three-quarters of a meter from the docking station, or some other suitable distance.

At 918, an infrared sensor on the robot is monitored for receipt of an IR beam emitted from the docking station.

At 920, a detection is made that the IR light sensor has received the IR beam emitted from the docking station. Accordingly, as described above, the robot can ascertain that the robot is oriented appropriately with the docking station and can continue driving onto the docking station.

At 922, the robot is caused to dock with the docking station responsive to detecting that the infrared light emitted from the docking station has been received by the infrared sensor on the robot. The methodology 900 completes at 924.

Figure 10:
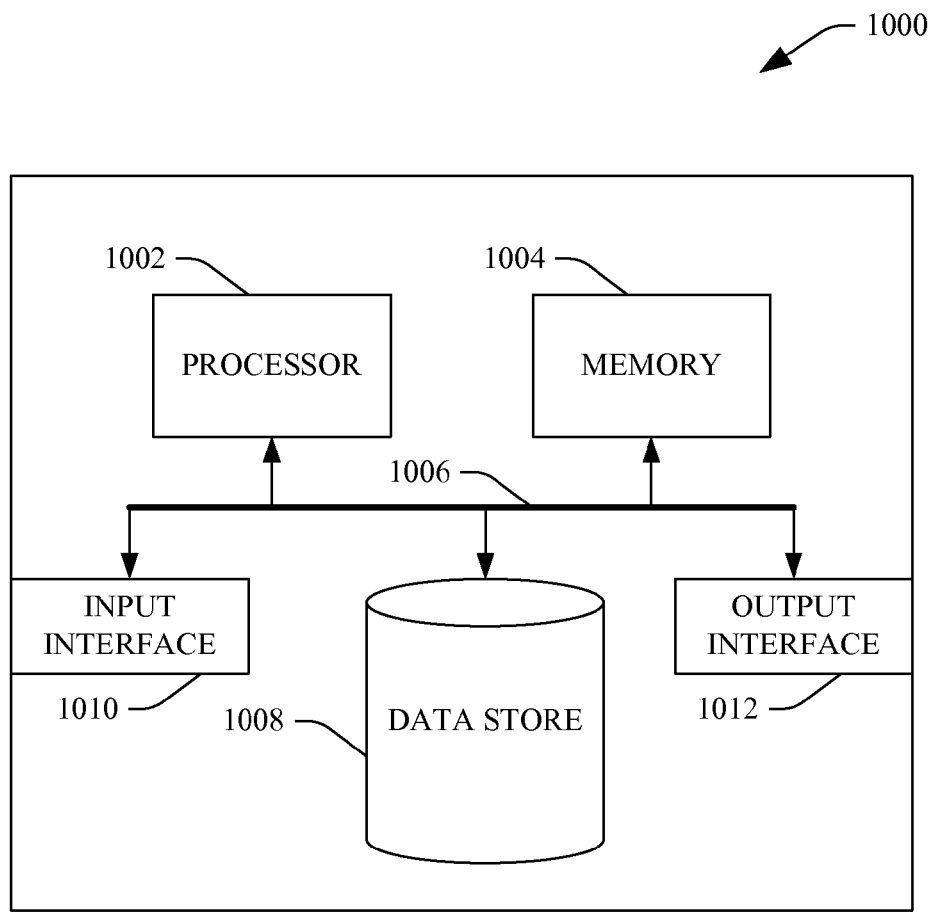
FIG. 10 is an exemplary computing system.

Now referring to FIG. 10, a high-level illustration of an exemplary computing device 1000 that can be used in accordance with the systems and methodologies disclosed herein is illustrated. For instance, the computing device 1000 may be included in the robot 102. In another example, at least a portion of the computing device 1000 may be included in the docking station 104. The computing device 1000 includes at least one processor 1002 that executes instructions that are stored in a memory 1004. The memory 1004 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store IR signatures, IR images, RGB images, or the like.

The computing device 1000 additionally includes a data store 1008 that is accessible by the processor 1002 by way of the system bus 1006. The data store may be or include any suitable computer-readable storage, including a hard disk, memory, etc. The data store 1008 may include executable instructions, IR images, IR signatures, RGB images, etc. The computing device 1000 also includes an input interface 1010 that allows external devices to communicate with the computing device 1000. For instance, the input interface 1010 may be used to receive instructions from an external computer device, from a user, etc. The computing device 1000 also includes an output interface 1012 that interfaces the computing device 1000 with one or more external devices. For example, the computing device 1000 may display text, images, etc. by way of the output interface 1012.

Additionally, while illustrated as a single system, it is to be understood that the computing device 1000 may be a distributed system. Thus, for instance, several devices may be in communication by way of a network connection and may collectively perform tasks described as being performed by the computing device 1000.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:
1. A mobile robot, comprising:
a depth sensor;
a drive system;
electrical contacts that mate with electrical contacts of a docking station for the robot;
a processor; and a memory that comprises a plurality of components that are executable by the processor, the components comprising:
   an image generator component that causes the depth sensor to generate an image of the docking station, the image indicative of three-dimensional shape of the docking station;
   a comparer component that outputs a signal that is indicative of similarity between the image of the docking station with a previously captured image of the docking station, the previously captured image of the docking station being indicative of the three-dimensional shape of the docking station;
   a drive component that controls the drive system to cause the robot to autonomously dock in the docking station based at least in part upon the signal output by the comparer component; and
   a handshake component that undertakes a handshake protocol with the docking station by way of the electrical contacts of the robot and the electrical contacts of the docking station, and wherein the drive component causes the robot to drive off the docking station if the handshake component fails to complete the handshake protocol.

2. The mobile robot of claim 1, wherein the depth sensor comprises a camera that captures images of light in a non-visible spectrum.

3. The mobile robot of claim 2, wherein the camera is an infrared camera.

4. The mobile robot of claim 3, wherein the depth sensor comprises an infrared light projector that illuminates the docking station with infrared light.

5. The mobile robot of claim 1, further comprising an infrared sensor, and wherein the plurality of components further comprise a beam detector component that outputs a signal that indicates that the infrared sensor has received an infrared beam emitted from the docking station, and wherein the drive component controls the drive system to cause the robot to autonomously dock in the docking station based at least in part upon the signal output by the beam detector component.

6. The mobile robot of claim 5, wherein the comparer component ceases to compare images captured by the depth sensor with previously captured images responsive to the beam detector component outputting the signal.

7. The mobile robot of claim 1, wherein the plurality of components further comprises a power monitor component that monitors electric charge of a power source of the robot and outputs a signal when the electric charge is above a threshold, and wherein the drive component causes the drive system to drive the robot off of the docking station responsive to receipt of the signal from the power monitor component.

8. The mobile robot of claim 1, further comprising a video camera, wherein the drive component receives a signal captured by the camera and causes the drive system to drive the robot autonomously towards the docking station based upon the signal captured by the camera.

9. The mobile robot of claim 8, wherein the plurality of components further comprises a power monitor component that monitors power state of a power source of the robot and outputs a signal when the power state of the power source drops beneath a threshold, and wherein the drive component causes the drive motor to drive the robot towards the docking station responsive to receiving the signal from the power monitor component.

10. The mobile robot of claim 1, wherein the depth sensor comprises an infrared camera and an infrared projector, and wherein the docking station comprises reflectors that reflect infrared light emitted from the infrared projector from the docking station to the infrared camera.

11. The mobile robot of claim 1, wherein the depth sensor comprises an infrared sensor that is configured to capture infrared light emitted from at least one infrared light emitting diode on the docking station.

12. A method, comprising:
   causing an infrared camera in a robot to capture an infrared image of a docking station for the robot, the docking station configured to restore a power source of the robot;
   comparing the infrared image with a signature;
   identifying the docking station based at least in part upon the comparing of the infrared image with the signature;
   causing the robot to dock at the docking station responsive to the identifying of the docking station, wherein causing the robot to dock at the docking station comprises causing electrical contacts of the robot to mate with electrical contacts of the docking station;
   undertaking a handshake protocol with the docking station; and
   failing to complete the handshake protocol; and
   causing the robot to drive away from the docking station responsive to failing to complete the handshake protocol.

13. The method of claim 12, further comprising:
   detecting that a remaining power in the power source of the robot is beneath a threshold; and
   responsive to detecting that the remaining power in the power source of the robot is beneath the threshold, utilizing vision-based navigation and a map of an environment of the robot to autonomously direct the robot to the docking station.

14. The method of claim 13, further comprising:
   prior to causing the robot to dock at the docking station estimating that the robot is a threshold distance from the docking station; and
   responsive to estimating that the robot is the threshold distance from the docking station, causing the infrared camera to perform a scan of the environment of the robot to locate the docking station.

15. The method of claim 12, further comprising:
   monitoring infrared sensors on the robot for receipt of beams of infrared light emitted from the docking station; and
   causing the robot to dock at the docking station based at least in part upon the monitoring of the infrared sensors on the robot.

16. The method of claim 12, further comprising:
   causing at least one LED on the robot to emit beams of IR light when the robot is within a threshold distance from the docking station, wherein the docking station comprises at least one sensor that is configured to receive the beams of IR light when the robot is properly aligned with the docking station; and
   causing the robot to dock with the docking station based at least in part upon an alignment of the beams of IR light with the at least one sensor on the docking station.

17. The method of claim 12, further comprising:
   detecting that a power source of the robot is restored; and
   causing the robot to drive off of the docking station responsive to detecting that the power source of the robot is fully restored.

18. A robot that comprises a computer-readable medium that includes instructions that, when executed by a processor in the robot, causes the processor to perform acts comprising:

detecting that a power level in a power source that powers the robot is beneath a threshold;

automatically navigating towards a known location of a docking station based at least in part upon one or more images captured by a camera on the robot and a map of an environment of the robot;

estimating that the robot is within a first threshold distance from the docking station;

causing an infrared camera to capture an infrared image at an estimated location of the docking station responsive to the estimating that the robot is within the first threshold distance from the docking station;

comparing the infrared image with a previously generated signature of the docking station to determine a location of the docking station relative to the robot, wherein the previously generated signature is indicative of a three-dimensional shape of the docking station;

causing the robot to drive towards the location of the docking station determined by comparing the infrared image with the previously generated signature of the docking station;

estimating that the robot is within a second threshold distance of the docking station;

monitoring an infrared light sensor on the robot for infrared light emitted from the docking station responsive to estimating that the robot is within the second threshold distance of the docking station;

detecting that infrared light emitted from a light emitting diode on the docking station has been received by the infrared light sensor on the robot;

causing the robot to dock with the docking station responsive to detecting that the infrared light emitted from the light emitting diode on the docking station has been received by the infrared light sensor on the robot wherein causing the robot to dock with the docking station comprises causing electrical contacts of the robot to mate with electrical contacts of the docking station;

undertaking a handshake protocol with the docking station;

failing to complete the handshake protocol with the docking station; and driving the robot away from the docking station based upon the failing to complete the handshake protocol.

* * * * *